(12) United States Patent
Tamegai

(10) Patent No.: US 9,423,952 B2
(45) Date of Patent: Aug. 23, 2016

(54) DEVICE, METHOD, AND STORAGE MEDIUM STORING PROGRAM

(71) Applicant: KYOCERA CORPORATION, Kyoto-shi, Kyoto (JP)

(72) Inventor: Atsushi Tamegai, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 83 days.

(21) Appl. No.: 13/723,515

(22) Filed: Dec. 21, 2012

(65) Prior Publication Data

US 2013/0162571 A1    Jun. 27, 2013

(30) Foreign Application Priority Data

Dec. 27, 2011    (JP) ................................ 2011-286078

(51) Int. Cl.
| | |
|---|---|
| *G06F 3/0488* | (2013.01) |
| *G06F 3/041* | (2006.01) |
| *G06F 3/0481* | (2013.01) |
| *H04M 1/673* | (2006.01) |

(52) U.S. Cl.
CPC ......... *G06F 3/04883* (2013.01); *G06F 3/0412* (2013.01); *G06F 3/04817* (2013.01); *H04M 1/673* (2013.01); *G06F 2201/825* (2013.01)

(58) Field of Classification Search
CPC ........... G06F 2201/825; G06F 3/0142; G06F 3/04817; G06F 3/04883

USPC .......................... 345/173–178; 455/410, 411
See application file for complete search history.

(56) References Cited

U.S. PATENT DOCUMENTS

| | | | |
|---|---|---|---|
| 2007/0236475 A1* | 10/2007 | Wherry | 345/173 |
| 2008/0165160 A1 | 7/2008 | Kocienda et al. | |
| 2010/0269040 A1* | 10/2010 | Lee | 715/702 |
| 2011/0294467 A1 | 12/2011 | Kim et al. | |
| 2012/0084734 A1* | 4/2012 | Wilairat | G06F 21/36 715/863 |
| 2012/0284673 A1* | 11/2012 | Lamb et al. | 715/863 |
| 2012/0284789 A1* | 11/2012 | Kim et al. | 726/19 |

FOREIGN PATENT DOCUMENTS

WO        2008086302 A1      7/2008

OTHER PUBLICATIONS

Office Action mailed on Mar. 10, 2015 in corresponding Japanese Patent Application No. 2011-286078, and English language Statement of Relevance thereof.

* cited by examiner

*Primary Examiner* — David Tung
(74) *Attorney, Agent, or Firm* — Hauptman Ham, LLP

(57) ABSTRACT

According to an aspect, a device includes a touch screen display and a controller. The touch screen display displays a lock screen provided with a display area in which any of a plurality of icons is displayed. The controller displays any of the icons in the display area according to a first touch gesture detected through the touch screen display while the lock screen is displayed.

14 Claims, 18 Drawing Sheets

DEVICE, METHOD, AND STORAGE MEDIUM STORING PROGRAM

CROSS-REFERENCE TO RELATED APPLICATIONS

This application claims priority from Japanese Application No. 2011-286078, filed on Dec. 27, 2011, the content of which is incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of the touch screen devices display a screen called "lock screen" on a display from the viewpoint of prevention of user's malfunction and security. When the lock screen is displayed, the touch screen device does not accept any operation except for a specific operation. Therefore, a usage of the touch screen device is limited when the lock screen is displayed.

For these reasons, there is a need for a device, a method, and a program capable of improving the usage during the display of the lock screen.

SUMMARY

According to an aspect, a device includes a touch screen display and a controller. The touch screen display displays a lock screen provided with a display area in which any of a plurality of icons is displayed. The controller displays any of the icons in the display area according to a first touch gesture detected through the touch screen display while the lock screen is displayed.

According to another aspect, a method is for controlling a device with a touch screen display. The method includes: displaying a lock screen provided with a display area, in which any of a plurality of icons is displayed, on the touch screen display; and displaying any of the icons in the display area according to a first touch gesture detected through the touch screen display while the lock screen is displayed.

According to another aspect, a non-transitory storage medium stores a program. When executed by a device with a touch screen display, the program causes the device to execute: displaying a lock screen provided with a display area, in which any of a plurality of icons is displayed, on the touch screen display; and displaying any of the icons in the display area according to a first touch gesture detected through the touch screen display while the lock screen is displayed.

DETAILED DESCRIPTION

Exemplary embodiments of the present invention will be explained in detail below with reference to the accompanying drawings. A smartphone will be explained below as an example of a device including a touch screen.

Figure 1:
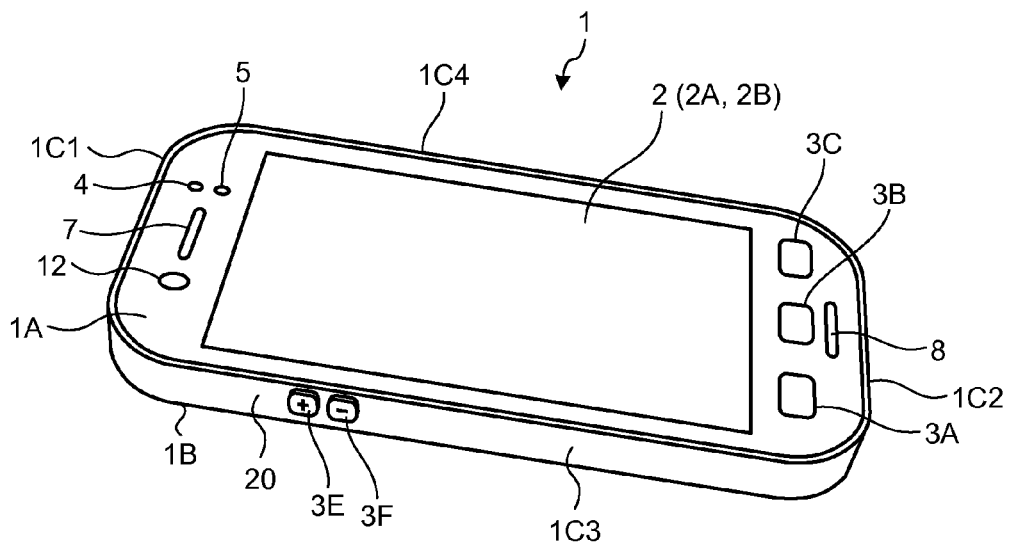
FIG. 1 is a perspective view of a smartphone according to an embodiment.
Figure 2:
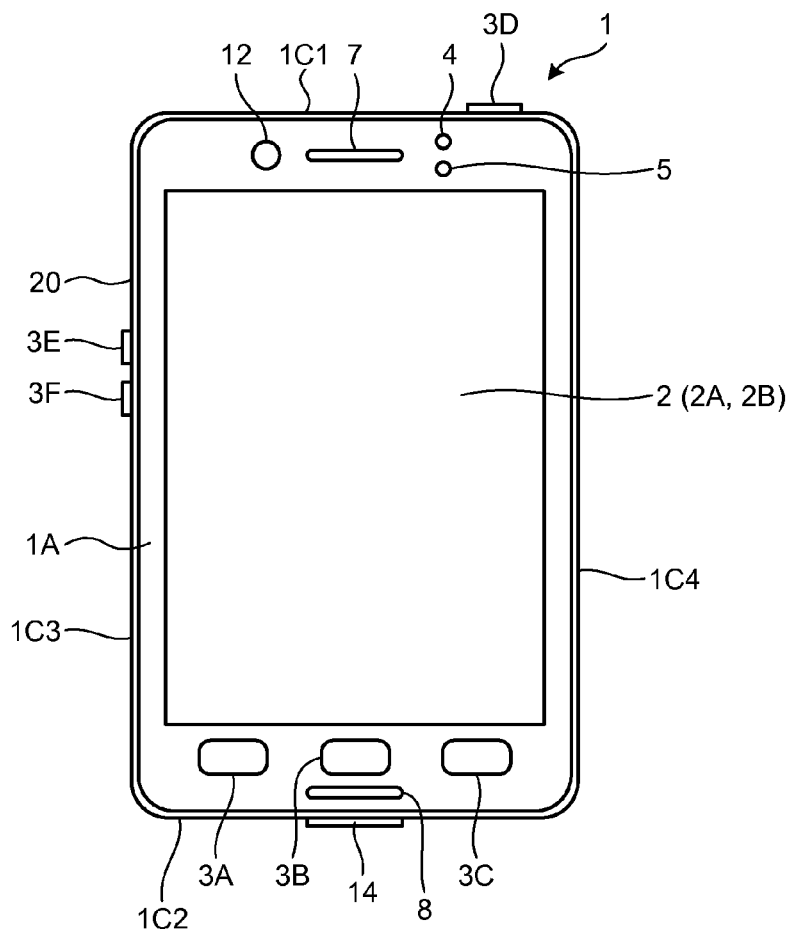
FIG. 2 is a front view of the smartphone.
Figure 3:
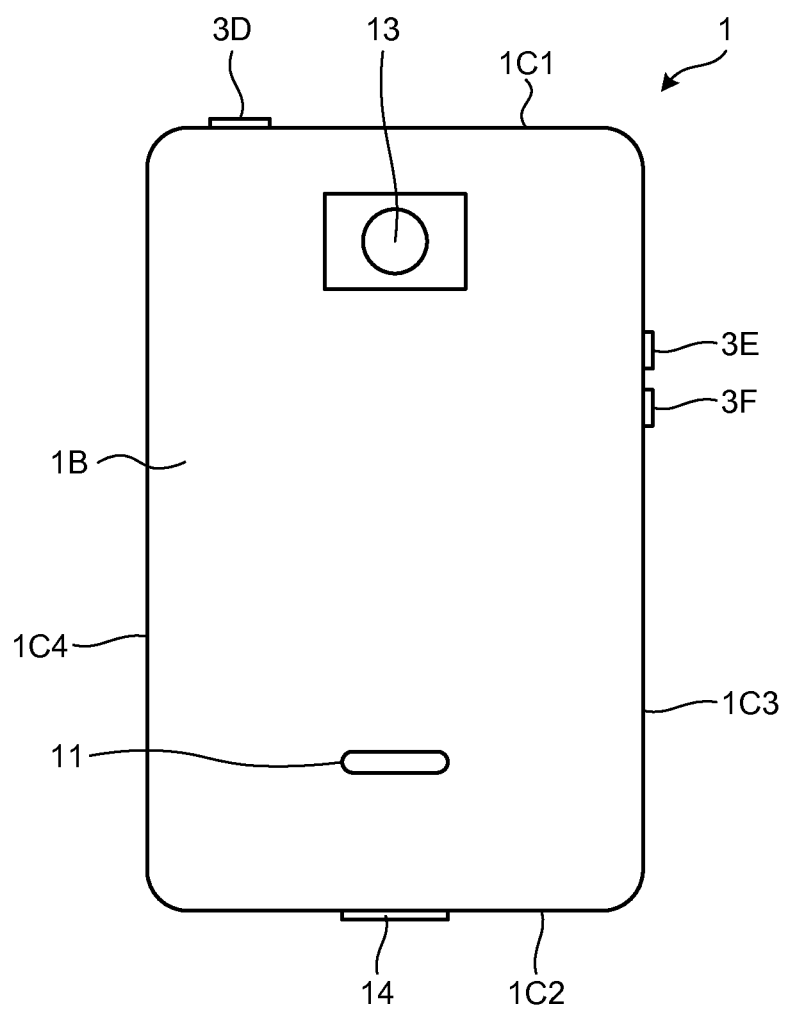
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B.

Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
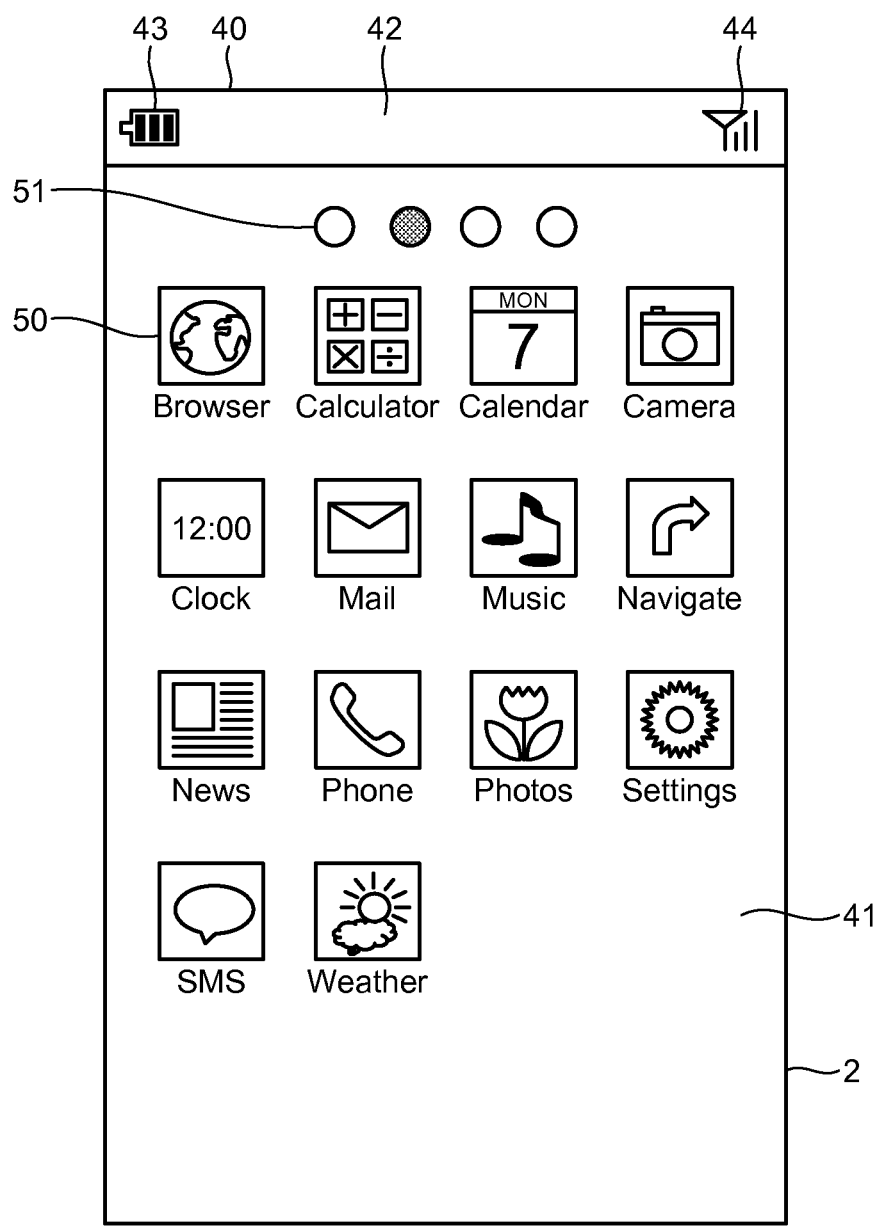
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even when there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation. A lock screen is also displayed on the display 2A as well as the home screen 40. The details of the lock screen will be described later.

Figure 5:
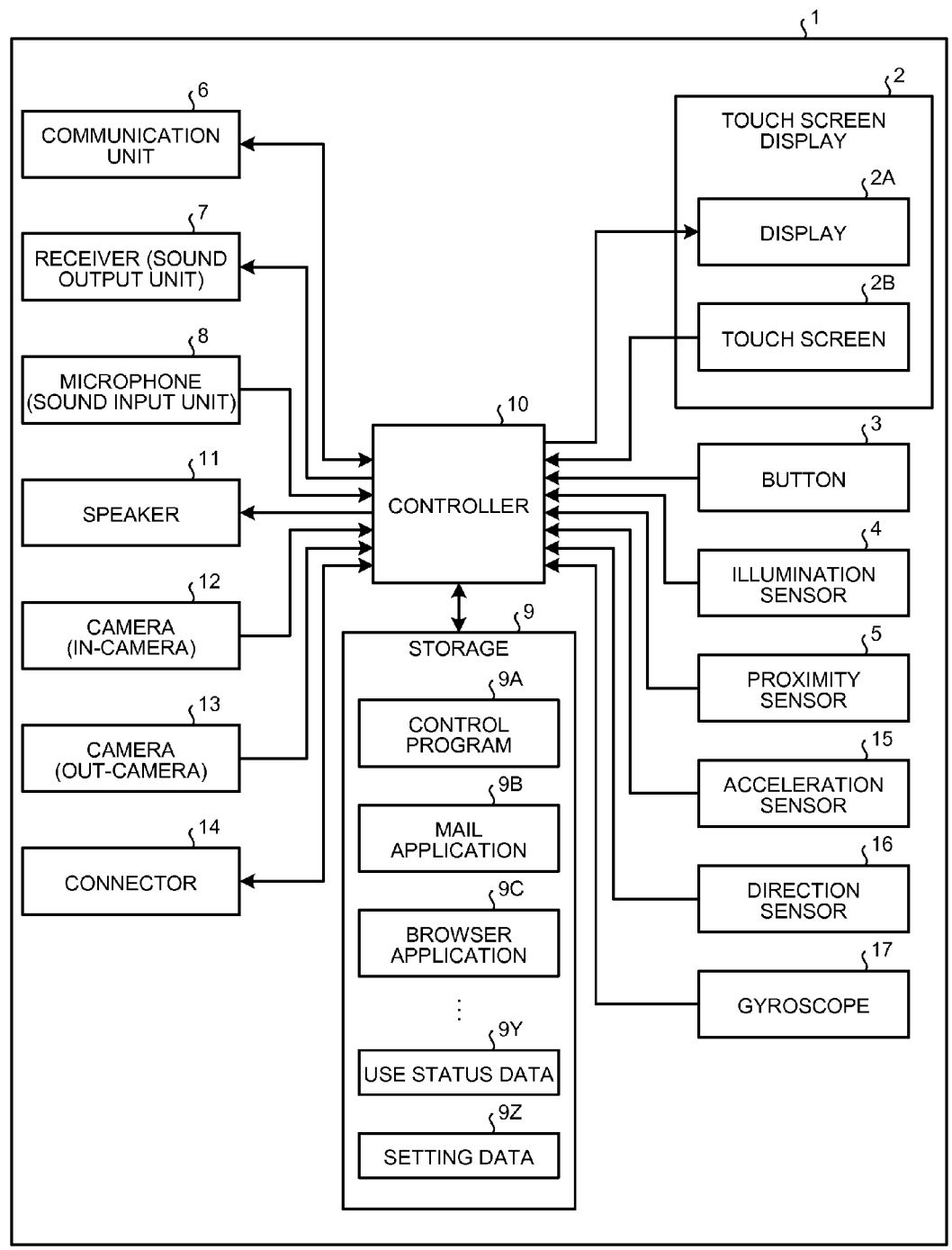
FIG. 5 is a block diagram of functions of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellular phones such as 2G, 3G, and 4G. The communication standard of cellular phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, use status data 9Y, and setting data 9Z. The mail application 9B provides an e-mail function. The e-mail function allows composition, transmission, reception, and display of e-mail, and the like. The browser application 9C provides a WEB browsing function. The WEB browsing function allows display of WEB pages, and edit of a book mark, and the like. The use status data 9Y contains information related to use statuses of applications installed into the smartphone 1. For example, the use status data 9Y includes items such as Screen, Row, Column, Image, Name, Installation Date/Time, Usage, and Last Use Date/Time, and holds data for each application installed into the smartphone 1. The setting data 9Z contains information related to various settings on the operations of the smartphone 1.

The control program 9A provides a function related to various controls for operating the smartphone 1. The control program 9A controls, for example, the communication unit 6, the receiver 7, and the microphone 8 to make a phone call. The function provided by the control program 9A includes a function for displaying a lock screen 60 in a locked state and a function for displaying any of icons 50 according to a gesture detected through the touch screen 2B when the lock screen 60 is displayed. The functions provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to display any of icons 50 on the display 2A according to a touch gesture detected through the touch screen 2B in the locked state in which the lock screen is displayed.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Examples of the controls based on the function provided by the control program 9A will be explained below with reference to the drawings. The function provided by the control program 9A includes a function for displaying any of icons 50 according to a gesture detected through the touch screen 2B in the locked state in which the lock screen 60 is displayed. For example, the smartphone 1 implements the control to change an icon 50 to be displayed, by the function provided by the control program 9A, according to a gesture detected through the touch screen 2B in the locked state in which the lock screen 60 is displayed.

Figure 6:
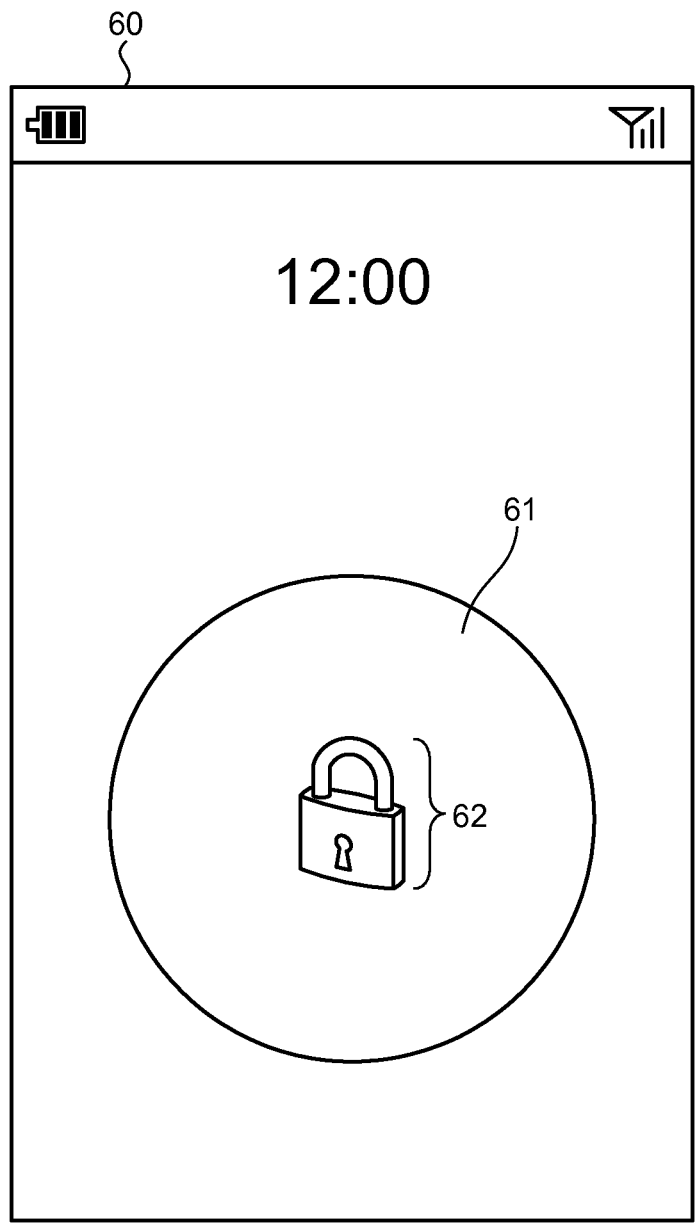
FIG. 6 is a diagram illustrating an example of a lock screen.

FIG. 6 depicts an example of the lock screen displayed on the display 2A. FIG. 6 is a diagram illustrating an example of the lock screen. The smartphone 1 displays the lock screen 60 illustrated in FIG. 6 as well as the home screen 40 illustrated in FIG. 4 on the display 2A. The lock screen as illustrated in FIG. 6 generally accepts only a specific operation including a release operation of the locked state from the viewpoint of prevention of user's malfunction and security. In the present embodiment, on the other hand, as a purpose of improving the usage during the display of the lock screen, the lock screen 60 accepts various operations other than specific operations such as an operation for displaying the lock screen on the display 2A and a release operation of the locked state.

The lock screen 60 in FIG. 6 is a screen initially displayed on the display 2A when the display 2A has recovered from its blackout. The lock screen 60 in FIG. 6 includes a display area 61. Displayed in the display area 61 is an image 62 indicating the lock screen. The image 62 may be a still image or a movable icon. Displaying the image 62 in the display area 61 in an initial state of the lock screen 60 is an example, and therefore the image does not have to be displayed. Hereinafter, for the sake of convenience of explanation, a state in which the lock screen 60 is displayed on the display 2A may be referred to as "locked state". As well as the image 62, any of icons is displayed in the display area 61 according to a touch gesture detected through the touch screen 2B.

Figure 7:
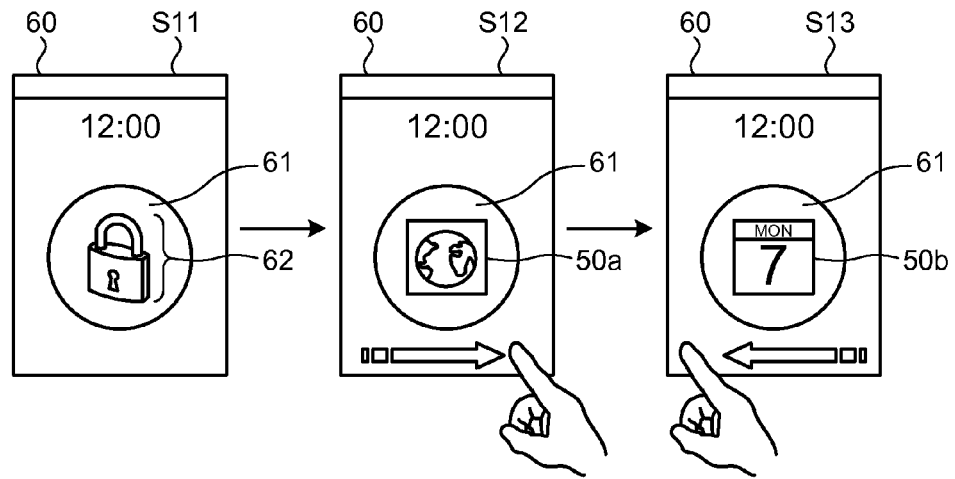
FIG. 7 is a diagram illustrating an example of control to change an icon to be displayed in a display area.

FIG. 7 depicts an example of control to change an icon 50 to be displayed in the display area 61 according to a touch gesture detected through the touch screen 2B in the locked state in which the lock screen 60 is displayed. FIG. 7 is a diagram illustrating an example of control to change an icon to be displayed in the display area. Step S11 to Step S13 illustrated in FIG. 7 represent how an icon displayed in the display area 61 is changed to another according to a swipe detected through the touch screen 2B.

Step S11 represents a locked state in which the image 62 is displayed in the display area 61 of the lock screen 60. Step S12 represents a state in which the user's finger is swiped substantially horizontally from the bottom left of the lock screen 60 to the bottom right thereof and a state in which the image 62 displayed in the display area 61 is changed to an icon 50a. Step S13 represents a state in which the user's finger is swiped substantially horizontally from the bottom right of the lock screen 60 to the bottom left thereof and a state in which the icon 50a displayed in the display area 61 is changed to an icon 50b.

The smartphone 1 acquires a detection result of the touch screen 2B and changes the image 62 displayed in the display area 61 to the icon 50a according to a movement distance of the swipe as illustrated at Step S12. After the display of the icon 50a, the smartphone 1 acquires a detection result of the touch screen 2B and changes the icon 50a displayed in the display area 61 to the icon 50b according to a movement distance of the swipe as illustrated at Step S13.

For example, when a release is detected from the detection result of the touch screen 2B subsequent to the state of Step S12, the smartphone 1 executes a process associated with the icon 50a displayed in the display area 61 at that time. When a release is detected from the detection result of the touch screen 2B subsequent to the state of Step S13, the smartphone 1 executes a process associated with the icon 50b displayed in the display area 61 at that time. The smartphone 1 may execute the function associated with the icon 50a or the icon 50b while maintaining the locked state, or may release the locked state and execute the function associated with the icon 50a or the icon 50b. When the locked state is to be maintained, the smartphone 1 executes the process associated with the icon 50a or the icon 50b and then returns again to the locked state. When the locked state is to be released, for example, the smartphone 1 executes the process associated with the icon 50a or the icon 50b, and then displays the home screen 40 on the display 2A to make it possible to execute a process corresponding to other function.

As illustrated in FIG. 7, when a first touch gesture is detected from the detection result of the touch screen 2B while the lock screen 60 is displayed on the display 2A, the smartphone 1 changes an icon to be displayed in the display area 61. When detecting a second touch gesture from the detection result of the touch screen 2B, the smartphone 1 executes the process associated with the icon displayed in the display area 61 at the time when the second touch gesture is detected. From these steps, in the present embodiment, a plurality of processes other than the specific operation can be executed even if the lock screen 60 is displayed on the display 2A, thus improving the usage during the display of the lock screen 60.

Figure 8:
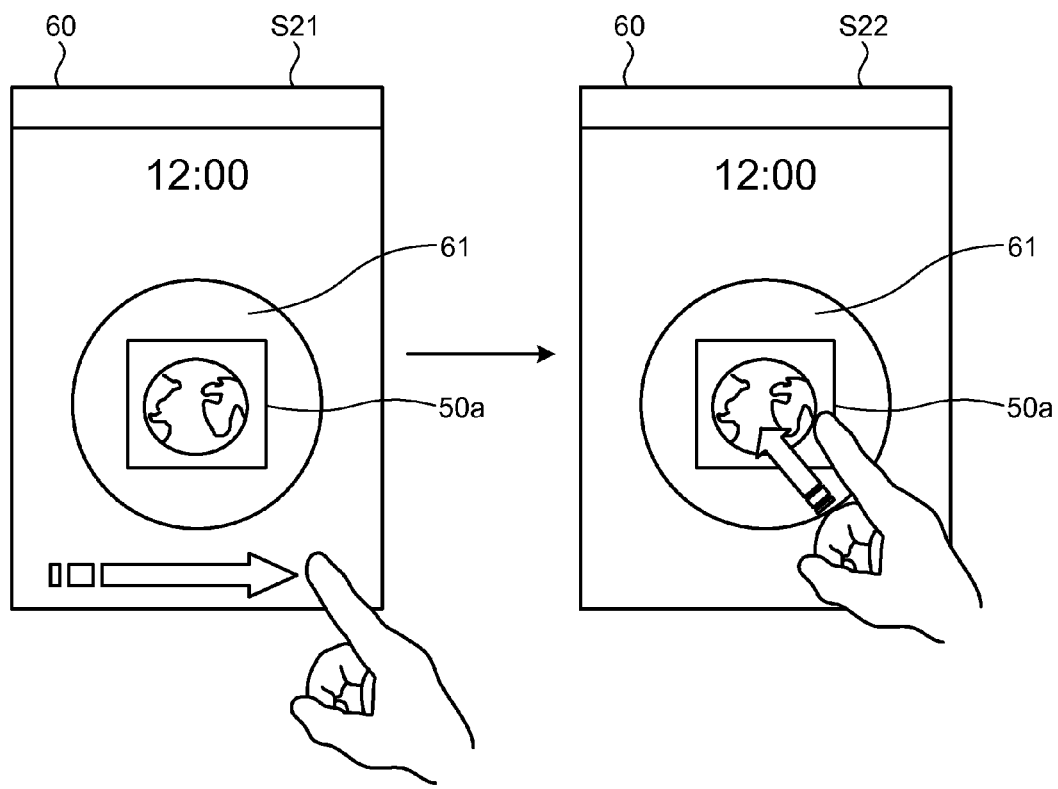
FIG. 8 is a diagram illustrating an example of operations for executing a process associated with the icon displayed in the display area.

In the example illustrated in FIG. 7, when detecting the release from the detection result of the touch screen 2B, the smartphone 1 executes the process associated with the icon currently displayed in the display area 61; however, the embodiment is not limited thereto. FIG. 8 depicts an example of another operation for executing the process associated with the icon displayed in the display area 61. As illustrated in FIG. 8, when a swipe from the position illustrated at Step S21 towards the display area 61 is detected, the smartphone 1 may execute the process associated with the icon 50*a* displayed in the display area 61. For example, the smartphone 1 executes the process associated with the icon 50*a* upon detecting such a swipe that the user's finger is placed on the icon 50*a* displayed in the display area 61. At this time, a screen corresponding to the process to be executed is displayed on the display 2A. In the case of FIG. 8, the user can easily execute the change of an icon and the process associated with the icon by a continuous swipe operation performed on the lock screen.

FIG. 8 describes the example in which the smartphone 1 executes the process associated with the icon when a swipe towards the display area 61 is detected; however, the embodiment is not limited thereto. For example, when detecting a swipe towards a specific area set in the lock screen 60, the smartphone 1 may execute the process associated with the icon. Alternatively, when detecting as the second touch gesture of tapping or double-tapping on the display area 61, or of dragging the icon to the outside of the display area 61, the smartphone 1 may execute the process associated with the icon.

Figure 9:
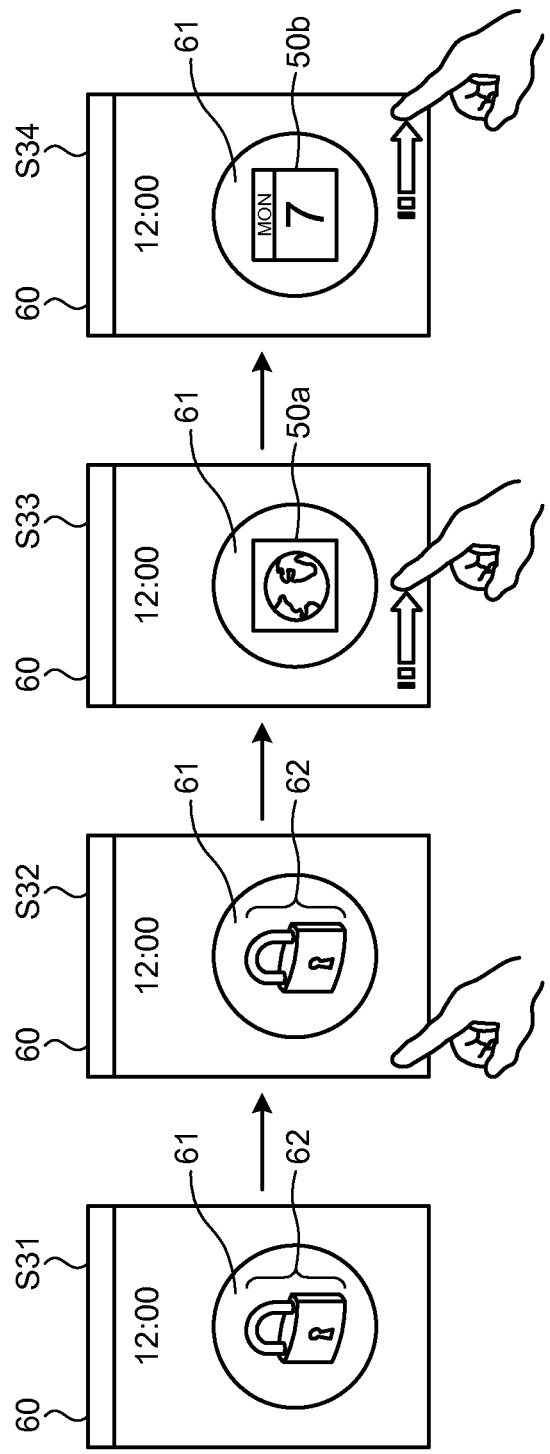
FIG. 9 is a diagram illustrating an example of control to change an icon to be displayed in the display area.

FIG. 9 depicts an example of control different from that of FIG. 7. FIG. 9 is a diagram illustrating an example of control to change an icon to be displayed in the display area. Step S31 to Step S34 illustrated in FIG. 9 represent how an icon displayed in the display area 61 is changed to another according to a movement distance of a horizontal swipe detected through the touch screen 2B.

Step S31 represents the locked state in which the image 62 is displayed in the display area 61 of the lock screen 60. Step S32 represents a state in which the user's finger is in contact to a position at the bottom left of the lock screen 60. Step S33 represents a state in which the user's finger is swiped substantially horizontally across the lock screen 60 from the position illustrated at Step S32 to the position illustrated at Step S33, and a state in which the image 62 displayed in the display area 61 is changed to the icon 50*a*. Step S34 represents a state in which the user's finger is swiped substantially horizontally across the lock screen 60 from the position illustrated at Step S33 to the position illustrated at Step S34, and a state in which the icon 50*a* displayed in the display area 61 is changed to the icon 50*b*.

The smartphone 1 acquires a detection result of the touch screen 2B and changes the image 62 displayed in the display area 61 to the icon 50*a* according to the movement distance of the swipe from the position at Step S32 to the position at Step S33. Subsequently, the smartphone 1 acquires a detection result of the touch screen 2B and changes the icon 50*a* displayed in the display area 61 to the icon 50*b* according to the movement distance of the swipe from the position at Step S33 to the position at Step S34.

For example, when a release is detected from the detection result of the touch screen 2B subsequent to the state of Step S33, the smartphone 1 executes the process associated with the icon 50*a* displayed in the display area 61 at that time. When a release is detected from the detection result of the touch screen 2B subsequent to the state of Step S34, the smartphone 1 executes the process associated with the icon 50*b* displayed in the display area 61 at that time.

As illustrated in FIG. 9, when a first touch gesture is detected from the detection result of the touch screen 2B while the lock screen 60 is displayed on the display 2A, the smartphone 1 changes an icon to be displayed in the display area 61 according to the movement distance of the first touch gesture. Subsequently, when a second touch gesture is detected from the detection result of the touch screen 2B, the smartphone 1 executes the process associated with the icon displayed in the display area 61 at the time when the second touch gesture is detected. From these steps, in the present embodiment, a plurality of processes other than the specific operation can be executed even if the lock screen 60 is displayed on the display 2A, thus improving the usage during the display of the lock screen 60, similarly to the case of FIG. 7.

In the smartphone 1, the case of changing the icon is not limited to the case according to the movement distance of the swipe, and therefore the icon may be changed according to a duration of the swipe. When an icon is to be displayed in the display area 61 according to a movement distance of a swipe, the smartphone 1 may set a condition that the movement distance of the swipe should be a predetermined distance or more. When an icon is to be displayed in the display area 61 according to a duration of a swipe, the smartphone 1 may set a condition that the duration of the swipe should be a predetermined time or more. The purpose of these is to prevent a malfunction.

Figure 10:
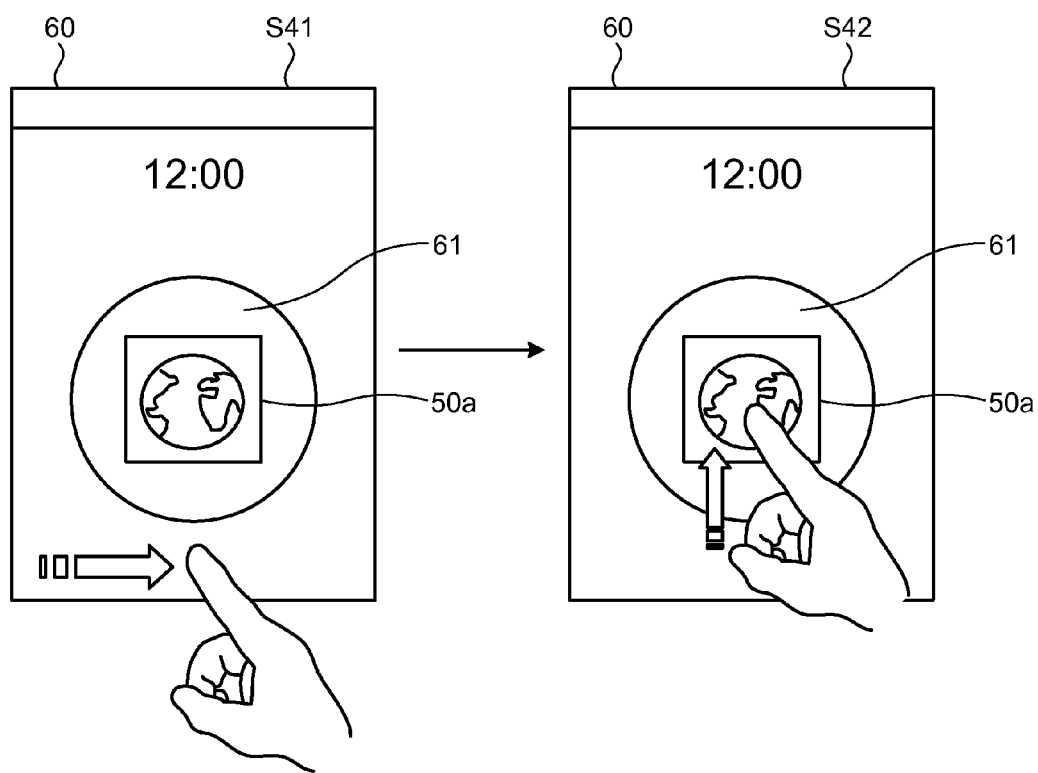
FIG. 10 is a diagram illustrating an example of operations for executing a process associated with the icon displayed in the display area.

When detecting the release from the detection result of the touch screen 2B in FIG. 9, the smartphone 1 executes the process associated with the icon 50*b* currently displayed in the display area 61; however, the embodiment is not limited thereto. FIG. 10 depicts an example of an operation for executing the process associated with the icon displayed in the display area. As illustrated in FIG. 10, when a swipe from the position illustrated at Step S41 towards the display area 61 is detected, the smartphone 1 may execute the process associated with the icon 50*a* displayed in the display area 61. For example, the smartphone 1 executes the process associated with the icon 50*a* upon detecting such a swipe that the user's finger is placed on the icon 50*a* displayed in the display area 61. At this time, a screen corresponding to the process to be executed is displayed on the display 2A. In the case of FIG. 10, the user can easily execute the change of the icon and the process associated with the icon by a continuous swipe operation performed on the lock screen. When a flick towards the display area 61 is detected subsequent to the swipe, the smartphone 1 may execute the process associated with the icon.

In the cases of FIG. 7 and FIG. 9, the examples in which the smartphone 1 detects a swipe performed on an area below the center of the lock screen 60 have been explained; however, the embodiment is not limited thereto, and therefore the swipe may be detected at any part of the lock screen 60.

Figure 11:
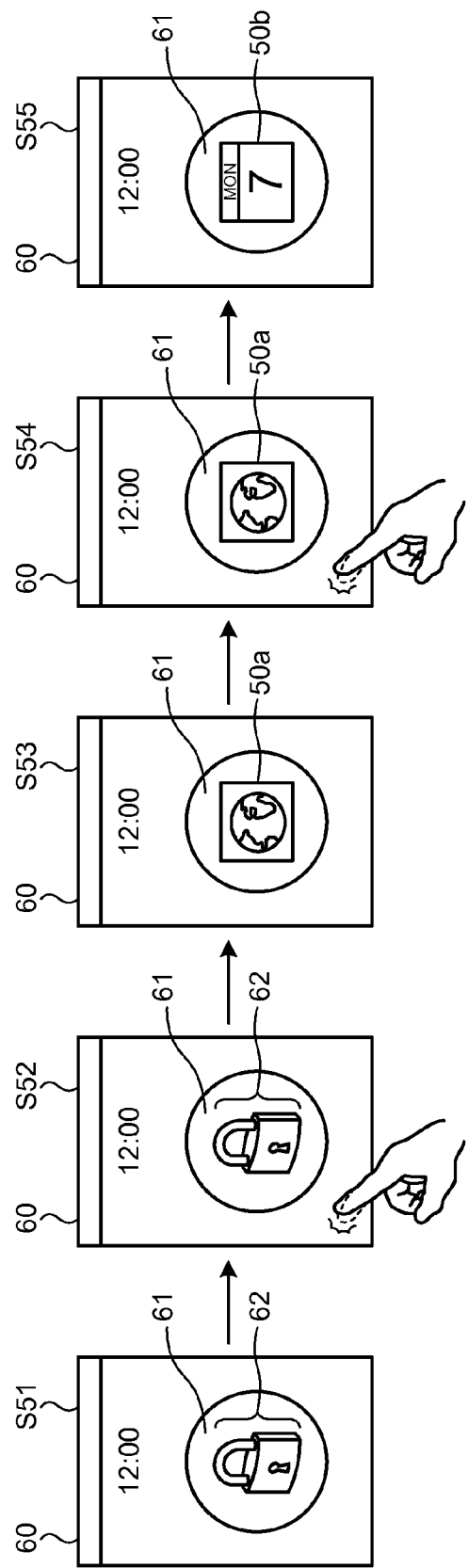
FIG. 11 is a diagram illustrating an example of control to change an icon to be displayed in the display area.

FIG. 7 and FIG. 9 depict the examples in which the smartphone 1 controls to detect a swipe as the first touch gesture and to change an icon to be displayed according to the detected swipe; however, the embodiment is not limited thereto. For example, the smartphone 1 may detect a tap as the first touch gesture and change an icon to be displayed according to the detected tap. An example of control to detect a tap as the first touch gesture will be explained below with reference to FIG. 11. FIG. 11 is a diagram illustrating an example of control to change an icon to be displayed in the display area. Step S51 to Step S55 illustrated in FIG. 11 represent how an icon displayed in the display area 61 is changed to another according to a tap detected through the touch screen 2B.

Step S51 represents the locked state in which the image 62 is displayed in the display area 61 of the lock screen 60. Step S52 represents a state in which the user's finger taps on the bottom left of the lock screen 60. Step S53 represents a state in which the image 62 displayed in the display area 61 is changed to the icon 50*a*. Step S54 represents a state in which the user's finger taps on the bottom left of the lock screen 60.

Step S55 represents a state in which the icon 50a displayed in the display area 61 is changed to the icon 50b.

At Step S52, when the tap performed on the lock screen 60 is detected from the detection result of the touch screen 2B, then, as illustrated at Step S53, the smartphone 1 changes the image 62 displayed in the display area 61 to the icon 50a. Subsequently, at Step S54, when the tap performed on the lock screen 60 is detected from the detection result of the touch screen 2B, then, as illustrated at Step S55, the smartphone 1 changes the icon 50a displayed in the display area 61 to the icon 50b. The smartphone 1 can use arbitrary times as the number of taps required to change an icon.

For example, when a tap performed on the icon 50a is detected from the detection result of the touch screen 2B subsequent to the state of Step S53, the smartphone 1 executes the process associated with the icon 50a. When a tap performed on the icon 50b is detected from the detection result of the touch screen 2B subsequent to the state of Step S55, the smartphone 1 executes the process associated with the icon 50b.

As illustrated in FIG. 11, when a tap is detected as the first touch gesture in an area other than the display area 61 from the detection result of the touch screen 2B while the lock screen 60 is displayed on the display 2A, the smartphone 1 changes an icon to be displayed in the display area 61 according to the number of detected taps. Subsequently, when a tap performed on the icon displayed in the display area 61 is detected as the second touch gesture from the detection result of the touch screen 2B, the smartphone 1 executes the process associated with the icon. From these steps, in the present embodiment, the usage during the display of the lock screen 60 can be improved, similarly to the cases of FIG. 7 and FIG. 9, even if the lock screen 60 is displayed on the display 2A.

In the case of FIG. 11, the smartphone 1 may separately group types of icons to be displayed in the display area 61 according to the number of detected taps or the position of each detected tap.

As explained above, the case in which the smartphone 1 detects, as the first touch gesture, a linear swipe in one direction on the lock screen 60 or detects a tap on the lock screen 60 has been explained. However, the embodiment is not limited thereto, and therefore a long touch may be detected as the first touch gesture. For example, when a long touch is detected as the first touch gesture, the smartphone 1 may change an icon to be displayed in the display area 61. The smartphone 1 may change an icon according to a duration of the long touch. The smartphone 1 may limit an area, on the lock screen 60, in which a long touch is detected.

FIG. 7 and FIG. 9 have explained the cases of detecting, as the first touch gesture, the linear swipe in one direction on the lock screen 60; however, the embodiment is not limited thereto. For example, a clockwise or a counterclockwise swipe performed on a preset area of the lock screen 60 may be detected.

Figure 12:
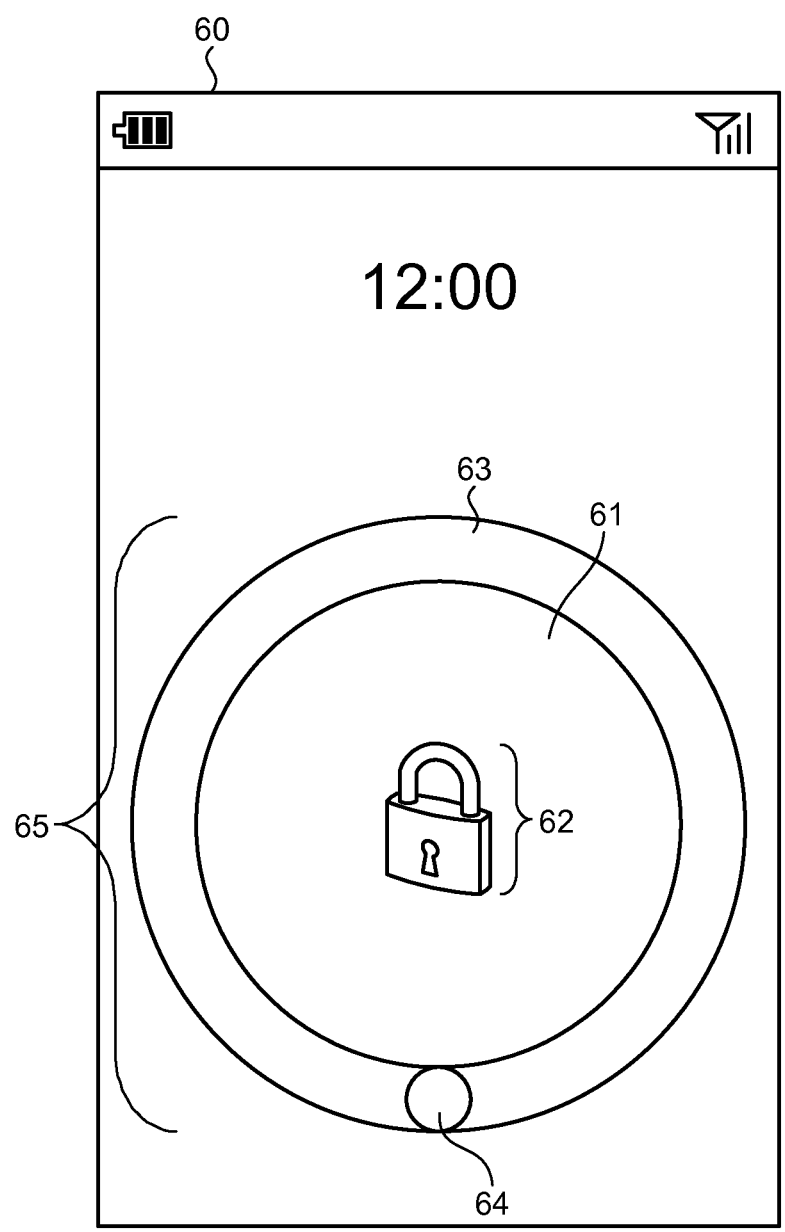
FIG. 12 is a diagram illustrating an example of the lock screen.

FIG. 12 depicts an example of a lock screen different from that of FIG. 6. FIG. 12 is a diagram illustrating an example of the lock screen. The lock screen 60 in FIG. 12 is a screen initially displayed on the display 2A when the display 2A has recovered from its blackout. Hereinafter, for the sake of convenience of explanation, the lock screen 60 in FIG. 12 may be referred to as "initial screen".

The lock screen 60 in FIG. 12 displays an object 65 including a path 63 and an operation point 64 in addition to the display area 61. The path 63 represents an area of the lock screen 60 along which the user has to swipe. The operation point 64 is an object that moves with the user's swipe. The display area 61 of the lock screen 60 in FIG. 12 also displays the image 62 indicating the lock screen similarly to that of FIG. 6. In the initial state of the lock screen 60, displaying the image 62 in the display area 61 is only an example, and therefore the image 62 does not have to be displayed. Hereinafter, for the sake of convenience of explanation, the state in which the lock screen 60 is displayed on the display 2A may be referred to as "locked state". The display area 61 displays any of icons other than the image 62 according to a touch gesture detected through the touch screen 2B.

Figure 13:
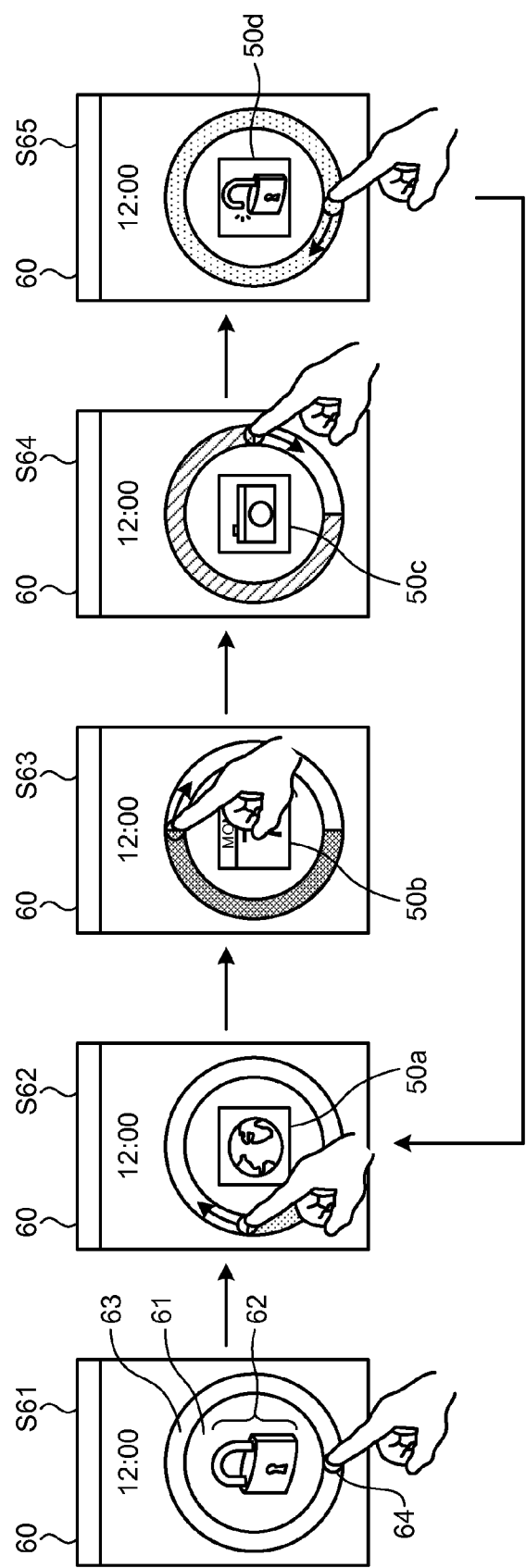
FIG. 13 is a diagram illustrating an example of control to change an icon to be displayed in the display area.

FIG. 13 depicts an example of control to change an icon 50 to be displayed in the display area 61 according to a user's operation detected through the touch screen 2B while the lock screen 60 is displayed. FIG. 13 is a diagram illustrating an example of control to change an icon to be displayed in the display area. Step S61 to Step S65 illustrated in FIG. 13 represent how an icon displayed in the display area 61 is changed to another according to a movement distance of a clockwise swipe detected through the touch screen 2B.

Step S61 represents the locked state in which the image 62 is displayed in the display area 61 of the lock screen 60. Step S61 represents a state in which the user's finger is in contact to the operation point 64 provided in the path 63 of the lock screen 60. At Step S61, the user's finger is detected by the touch screen 2B.

Step S62 represents a state in which the user's finger is swiped clockwise along the path 63. The smartphone 1 acquires a detection result of the touch screen 2B and changes the image 62 displayed in the display area 61 to the icon 50a according to a movement distance of the swipe when the user's finger is swiped clockwise along the path 63. When detecting a release from the operation point 64, the smartphone 1 executes the function corresponding to the icon 50a displayed in the display area 61 at the time when the release is detected. Furthermore, the smartphone 1 changes the color of the path 63 along part of which the swipe is made from Step S61 to Step S62 to a color different from that of Step S61.

Step S63 represents a state in which the user's finger is further swiped clockwise along the path 63 from the state of Step S62. The smartphone 1 acquires a detection result of the touch screen 2B and changes the icon 50a displayed in the display area 61 at Step S62 to the icon 50b according to a movement distance of the swipe when the user's finger is swiped clockwise along the path 63. When detecting a release from the operation point 64, the smartphone 1 executes the process associated with the icon 50b displayed in the display area 61 at the time when the release is detected. Furthermore, the smartphone 1 changes the color of the path 63 along part of which the swipe is made from Step S61 to Step S63 to a color different from that of Step S62.

Step S64 represents a state in which the user's finger is further swiped clockwise along the path 63 from the state of Step S63. The smartphone 1 acquires a detection result of the touch screen 2B and changes the icon 50b displayed in the display area 61 to an icon 50c according to a movement distance of the swipe when the user's finger is swiped clockwise along the path 63. When detecting a release from the operation point 64, the smartphone 1 executes a process associated with the icon 50c displayed in the display area 61 at the time when the release is detected. Furthermore, the smartphone 1 changes the color of the path 63 along part of which the swipe is made from Step S61 to Step S64 to a color different from that of Step S63.

Step S65 represents a state in which the user's finger is further swiped clockwise along the path 63 from the state of Step S64. This means that, at Step S65, a clockwise circle swipe along the path 63 with the user's finger has been made once from the position illustrated at Step S61. The smartphone 1 acquires a detection result of the touch screen 2B and changes the icon 50c displayed in the display area 61 to an icon 50d according to a movement distance of the swipe when the user's finger is swiped clockwise along the path 63. Associated with the icon 50d is a function for executing a release process of the locked state.

When detecting a release from the operation point 64, the smartphone 1 executes a process associated with the icon 50d displayed in the display area 61 at the time when the release is detected. That is, the smartphone 1 releases the locked state and displays, for example, the home screen 40 illustrated in FIG. 4 on the display 2A. Furthermore, the smartphone 1 changes the color of the path 63 along which the swipe is made from Step S61 to Step S65 to a color different from that of Step S64. The smartphone 1 gradually changes the color of the path 63 according to the movement distance of the detected swipe. Such a color change enables the user to visually check that the swipe is detected by the smartphone 1. A portion of which color is changed is not limited to the path 63, and therefore it may be the background of the display area 61 or some other area.

When the user's finger is further swiped clockwise along the path 63 from the state of Step S65, the smartphone 1 returns again to Step S62. Thereafter, the smartphone 1 repeats the control from Step S62 to Step S65 according to the movement distance of the clockwise swipe performed by the user.

In the case of FIG. 13, the smartphone 1 displays the three icons of the icons arranged on the home screen 40 according to the movement distance of the swipe repeatedly in a successive manner; however, the embodiment is not limited thereto. For example, the smartphone 1 may successively display different icons in the display area 61 each time a user's circle swipe along the path 63 is repeatedly made. For example, the smartphone 1 may successively display the icons 50 arranged on the home screen 40 one by one. The smartphone 1 may cause the user to arbitrarily select an icon, which is displayed in the display area 61 according to the movement distance of the swipe, from among, for example, the icons 50 arranged on the home screen 40 in advance.

As illustrated in FIG. 13, when detecting a first touch gesture from the detection result of the touch screen 2B while the lock screen 60 is displayed on the display 2A, the smartphone 1 changes an icon to be displayed in the display area 61 according to the movement distance of the first touch gesture. When detecting a second touch gesture from the detection result of the touch screen 2B, the smartphone 1 executes the process associated with the icon displayed in the display area 61 at the time when the second touch gesture is detected. From these steps, in the present embodiment, a plurality of processes other than the specific operation can be executed even if the lock screen 60 is displayed on the display 2A, thus improving the usage during the display of the lock screen 60, similarly to the cases of FIG. 7, FIG. 9, and FIG. 11.

In the case of FIG. 13, the example in which the smartphone 1 controls to detect the clockwise swipe as the first touch gesture and to change an icon to be displayed according to the movement distance of the detected clockwise swipe has been explained. However, the embodiment is not limited thereto, and therefore an icon to be displayed in the display area 61 may be changed according to the distance and the direction of the swipe along the path 63. For example, when a swipe in a first direction (e.g., clockwise) is detected, the smartphone 1 adds a distance of the swipe, and when a swipe in a second direction (e.g., counterclockwise) is detected, the smartphone 1 subtracts a distance of the swipe, so that the smartphone 1 may calculate a movement direction of the swipe and change the icon according to the calculated movement distance. Another example of the control according to the distance and the direction of the swipe along the path 63 will be explained below with reference to FIG. 14.

Figure 14:
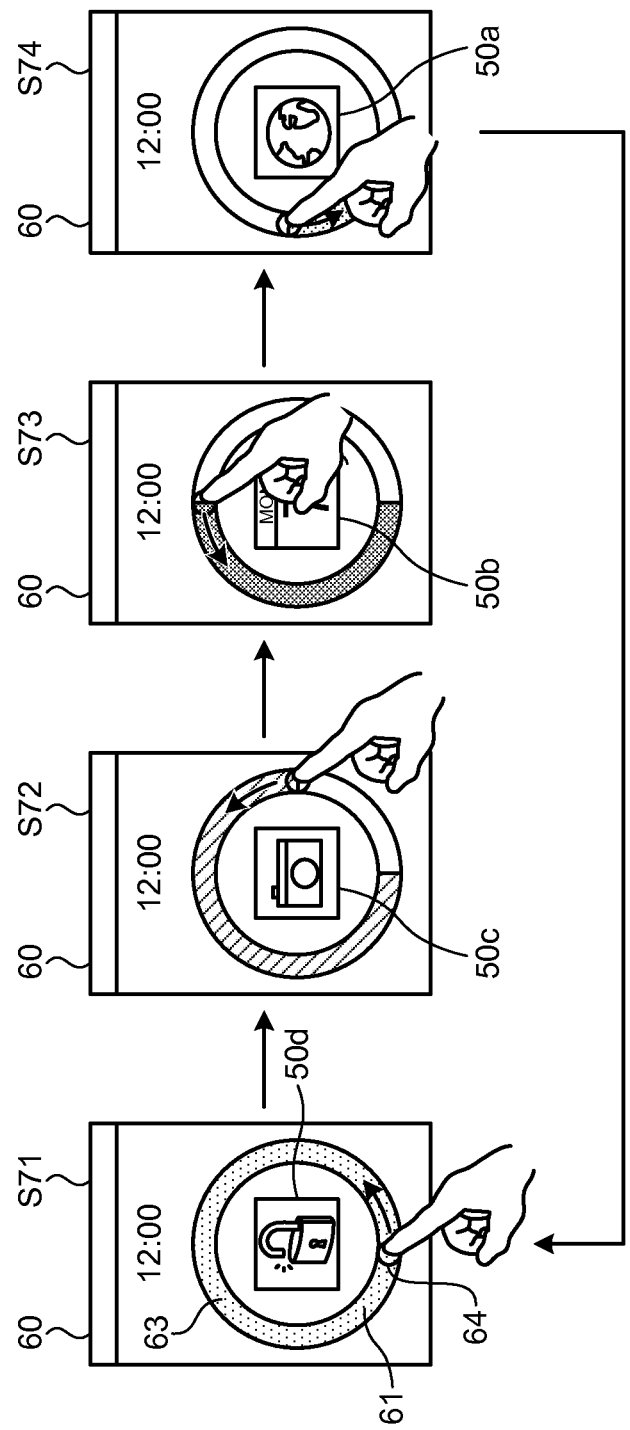
FIG. 14 is a diagram illustrating an example of control to change an icon to be displayed in the display area.

FIG. 14 depicts another example of the control to change an icon 50 to be displayed in the display area 61 according to a user's operation detected through the touch screen 2B while the lock screen 60 is displayed. FIG. 14 is a diagram illustrating an example of control to change an icon to be displayed in the display area. Step S71 to Step S74 illustrated in FIG. 14 represent how an icon displayed in the display area 61 is changed to another according to a counterclockwise swipe detected through the touch screen 2B.

Step S71 represents a state in which the icon 50d is displayed in the display area 61 of the lock screen 60. Step S71 corresponds to Step S65 illustrated in FIG. 13.

Step S72 represents a state in which the user's finger is swiped counterclockwise along the path 63 from the state of Step S71. The smartphone 1 acquires a detection result of the touch screen 2B, subtracts a movement distance of the swipe based on the counterclockwise swipe performed on the path 63 with the user's finger, and changes the icon 50d displayed in the display area 61 to the icon 50c according to the subtracted movement distance. When detecting a release from the operation point 64, the smartphone 1 executes the process associated with the icon 50c displayed in the display area 61 at the time when the release is detected. Furthermore, the smartphone 1 changes the color of the path 63 according to the counterclockwise swipe from Step S71 to Step S72. The color of the path 63 at Step S72 corresponds to the color of the path 63 at Step S64 in FIG. 13.

Step S73 represents a state in which the user's finger is further swiped counterclockwise along the path 63 from the state of Step S72. The smartphone 1 acquires a detection result of the touch screen 2B, subtracts a movement distance of the swipe based on the counterclockwise swipe performed on the path 63 with the user's finger, and changes the icon 50c displayed in the display area 61 to the icon 50b according to the subtracted movement distance. When detecting a release from the operation point 64, the smartphone 1 executes the process associated with the icon 50b displayed in the display area 61 at the time when the release is detected. Furthermore, the smartphone 1 changes the color of the path 63 according to the counterclockwise swipe from Step S72 to Step S73. The color of the path 63 at Step S73 corresponds to the color of the path 63 at Step S63 in FIG. 13.

Step S74 represents a state in which the user's finger is further swiped counterclockwise along the path 63 from the state of Step S73. The smartphone 1 acquires a detection result of the touch screen 2B, subtracts a movement distance of the swipe based on the counterclockwise swipe performed on the path 63 with the user's finger, and changes the icon 50b displayed in the display area 61 to the icon 50a according to the subtracted movement distance. When detecting a release from the operation point 64, the smartphone 1 executes the process associated with the icon 50a displayed in the display area 61 at the time when the release is detected. Furthermore, the smartphone 1 changes the color of the path 63 according to the counterclockwise swipe from Step S73 to Step S74. The color of the path 63 at Step S74 corresponds to the color of the path 63 at Step S62 in FIG. 13.

When the user's finger is further swiped counterclockwise along the path 63 from the state of Step S74, the smartphone 1 returns again to Step S71. Thereafter, the smartphone 1 subtracts a movement distance of the swipe based on the counterclockwise swipe performed on the path 63 with the user's finger, and repeats the control from Step S72 to Step S74 according to the subtracted movement distance.

In the case of FIG. 14, the smartphone 1 displays the three icons of the icons arranged on the home screen 40 repeatedly in a successive manner; however, the embodiment is not limited thereto. For example, the smartphone 1 may successively display different icons in the display area 61 each time a user's circle swipe along the path 63 is repeatedly made. For example, the smartphone 1 may successively display the icons 50 arranged on the home screen 40 one by one. The smartphone 1 may cause the user to arbitrarily select an icon, which is displayed in the display area 61 according to the movement distance of the swipe, from among, for example, the icons 50 arranged on the home screen 40 in advance.

In the case of FIG. 14, the smartphone 1 may be configured that if the user swipes in the first direction too far, the swipe can be back by a swipe in the second direction. The smartphone 1 may change an icon according to a duration of the swipe instead of the movement distance of the swipe. In the cases of FIG. 13 and FIG. 14, the smartphone 1 may be configured to separately group the types of icons to be changed according to the direction of the swipe.

In the cases of FIG. 13 and FIG. 14, the smartphone 1 may display the icon 50d in the display area 61 each time it is detected that a circle swipe along the path 63 is made a plurality of times. For example, the smartphone 1 may display the icon 50d in the display area 61 each time it is detected that the circle swipe along the path 63 is made twice.

Figure 15:
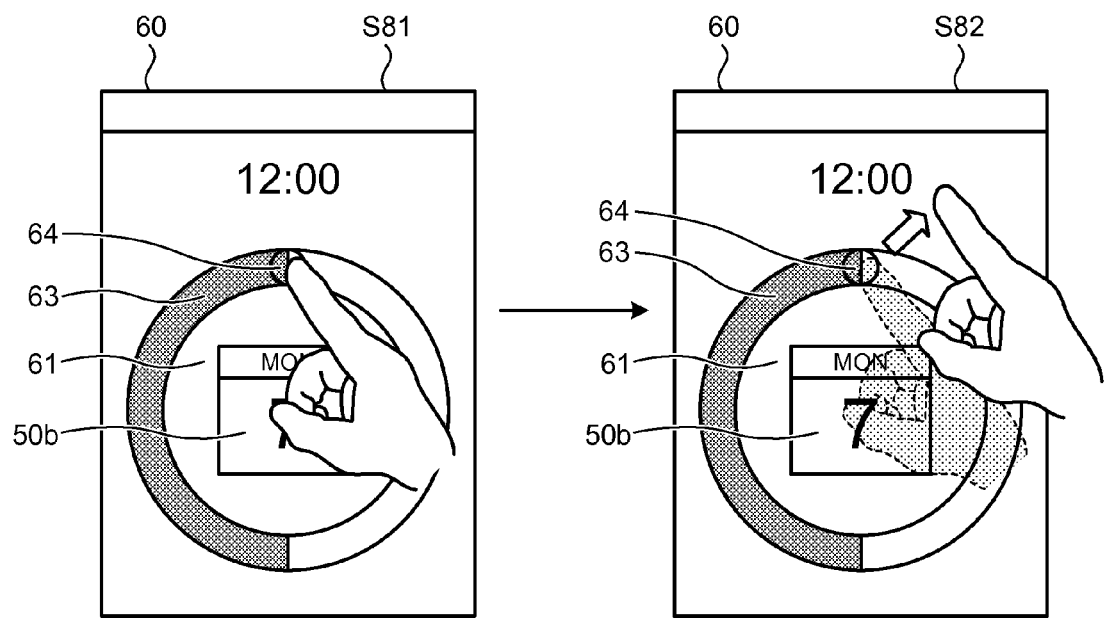
FIG. 15 is a diagram illustrating an example of operations for executing a process associated with the icon displayed in the display area.

In the cases of FIG. 13 and FIG. 14, when detecting a release from the operation point 64, the smartphone 1 executes the process associated with the icon; however, the embodiment is not limited thereto. FIG. 15 depicts an example of an operation for executing a process associated with the icon displayed in the display area. As illustrated at Step S81 and Step S82 in FIG. 15, when detecting that a user's finger swipe deviates from the area of the lock screen 60 with the path 63 to any area of the lock screen 60 with no path, the smartphone 1 executes the process associated with the icon 50b displayed in the display area 61.

For example, when accepting an operation of the button 3 from the user after the swipe is performed on the path 63, the smartphone 1 may return a display mode of the lock screen 60 to the initial screen illustrated in FIG. 12.

The object 65 does not have to include the operation point 64. In this case, even if the swipe is started at any part of the path 63, the smartphone 1 changes an icon to be displayed in the display area 61 according to a movement distance of the swipe or a duration thereof.

Figure 16:
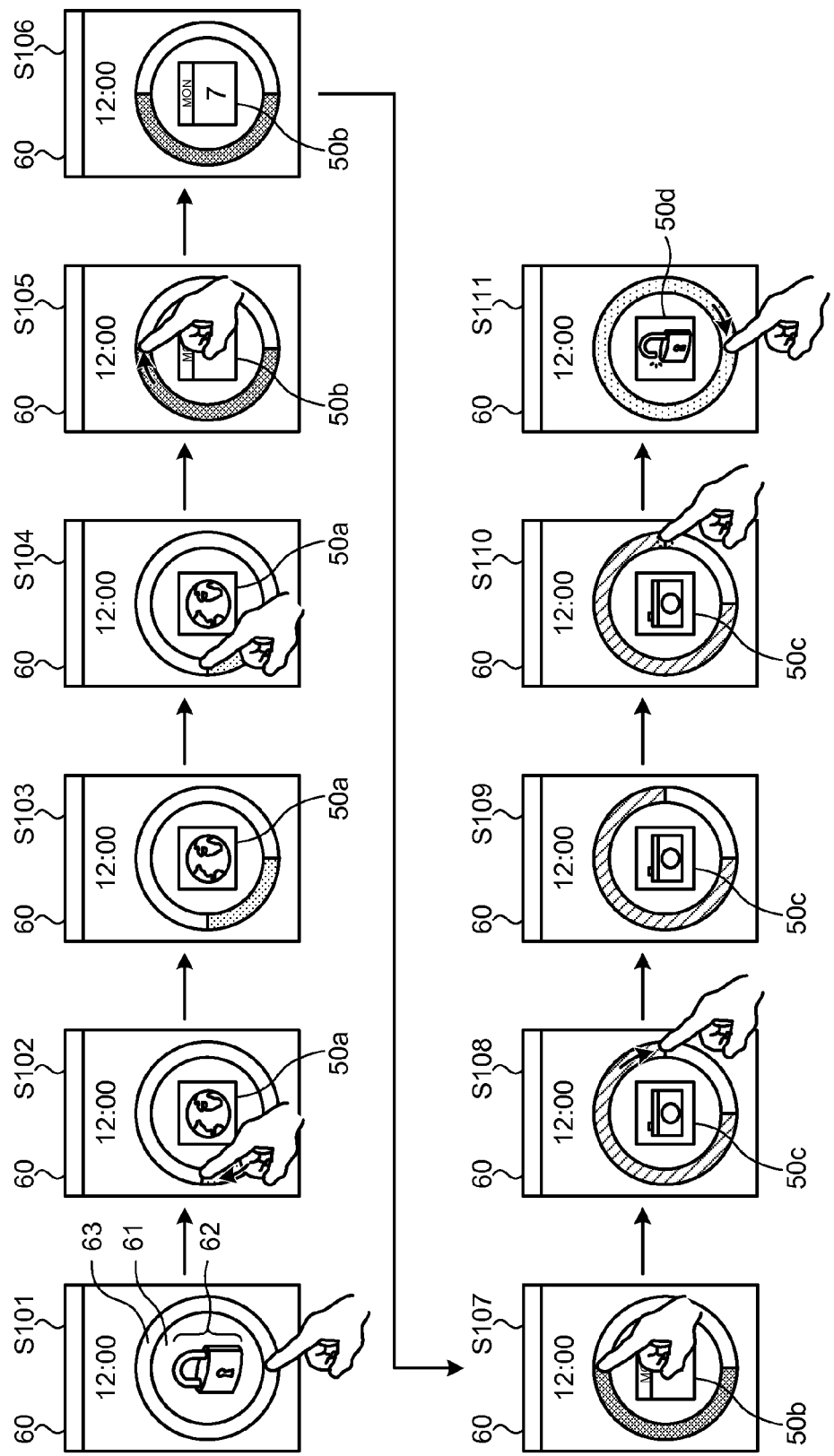
FIG. 16 is a diagram illustrating an example of control to continue a swipe once interrupted from an interrupted position.

As illustrated in FIG. 13 and FIG. 14, when an icon to be displayed in the display area 61 is changed according to the first touch gesture detected along the path 63, the second touch gesture may be any gesture not connected to the first touch gesture, such as a tap on an icon in the display area 61. In this way, when the gesture not connected to the first touch gesture is detected as the second touch gesture, the smartphone 1 may be configured to allow the user to interrupt once the swipe performed on the path 63 and then continue the swipe from the interrupted position. FIG. 16 depicts an example of control to continue the once interrupted swipe from the interrupted position. Step S101 to Step S111 illustrated in FIG. 16 represent how an icon displayed in the display area 61 is changed to another according to a movement distance of a clockwise swipe detected through the touch screen 2B when the once interrupted swipe is continued from the interrupted position.

As illustrated at Step S101 and Step S102, the smartphone 1 changes the image 62 displayed in the display area 61 to the icon 50a according to the movement distance of the swipe when the user's finger is swiped clockwise along the path 63. Subsequently, at Step S103, the user releases the finger from the lock screen 60, and the swipe is interrupted.

Then, as illustrated at Step S104 and Step S105, when the clockwise swipe is again continued from the position where the swipe is interrupted, the smartphone 1 adds a movement distance of the swipe and changes the icon 50a displayed in the display area 61 to the icon 50b according to the movement distance with the addition. Subsequently, at Step S106, the user releases the finger from the lock screen 60, and the swipe is interrupted similarly to Step S103.

Subsequently, as illustrated at Step S107 and Step S108, when the clockwise swipe is again continued from the position where the swipe is interrupted, the smartphone 1 adds a movement distance of the swipe and changes the icon 50b displayed in the display area 61 to the icon 50c according to the movement distance with the addition. Subsequently, at Step S109, the user releases the finger from the lock screen 60, and the swipe is interrupted similarly to Step S103 and Step S106.

Then, as illustrated at Step S110 and Step S111, when the clockwise swipe is continued again from the position where the swipe is interrupted, the smartphone 1 adds a movement distance of the swipe and changes the icon 50c displayed in the display area 61 to the icon 50d according to the movement distance with the addition. In this way, even when the once interrupted swipe is continued from its interrupted position, the smartphone 1 changes the icon to be displayed in the display area 61 according to the movement distance of the swipe detected through the touch screen 2B.

Figure 17:
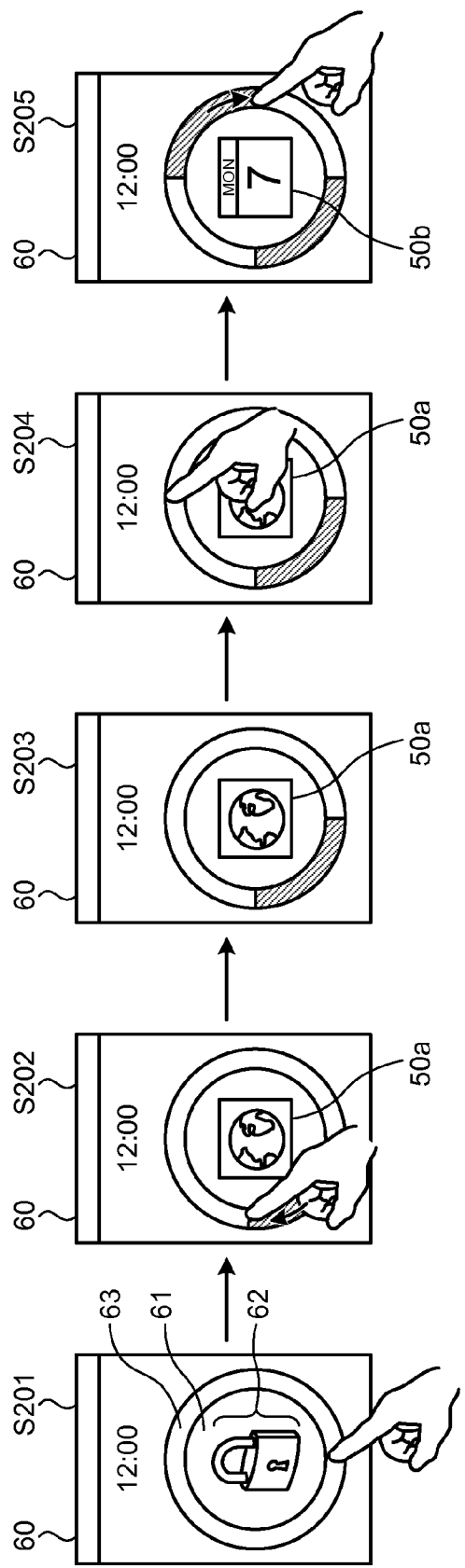
FIG. 17 is a diagram illustrating an example of control to continue a swipe once interrupted from any position other than an interrupted position.

In the case of FIG. 16, the case in which the swipe is continued again from the position where the swipe is interrupted has been explained; however, the swipe may be continued from any position other than the position where the swipe is interrupted. FIG. 17 depicts an example of the control to continue the once interrupted swipe from any position other than the position where the swipe is interrupted. Step S201 to Step S205 illustrated in FIG. 17 represent how an icon displayed in the display area 61 is changed to another according to a movement distance of a clockwise swipe detected through the touch screen 2B when the once interrupted swipe is continued from any position other than the position where the swipe is interrupted.

As illustrated at Step S201 and Step S202, the smartphone 1 changes the image 62 displayed in the display area 61 to the icon 50a according to the movement distance of the swipe when the user's finger is swiped clockwise along the path 63. Subsequently, at Step S203, the user releases the finger from the lock screen 60, and the swipe is interrupted.

Subsequently, as illustrated at Step S204 and Step S205, when the swipe is continued again from any position other than the position where the swipe is interrupted, the smartphone 1 adds a movement distance of the swipe and changes the icon 50a displayed in the display area 61 to the icon 50b according to the movement distance with the addition. That is, because the movement distance of the clockwise swipe becomes the same as that of Step S106 in FIG. 16, the smartphone 1 changes an icon to be displayed in the display area 61 from the icon 50a to the icon 50b. In this way, even if the swipe is performed from any part of the path, the smartphone 1 changes the icon according to the movement distance of the swipe. FIG. 17 depicts an example in which the smartphone 1 changes the color of a swipe-detected location in the path 63; however, the embodiment is not limited thereto. For example, the smartphone 1 may change the whole color of the path 63 at timing at which the once interrupted swipe is detected again. Such a color change enables the user to visually check that the swipe is detected by the smartphone 1. A portion of which color is changed is not limited to the path 63, and therefore it may be the background of the display area 61 or some other area.

The smartphone 1 may change an icon according to a position of the finger during the swipe instead of the movement distance of the swipe. An example of the control to change an icon according to a position of the finger during the swipe will be explained below with reference to the drawings.

Figure 18:
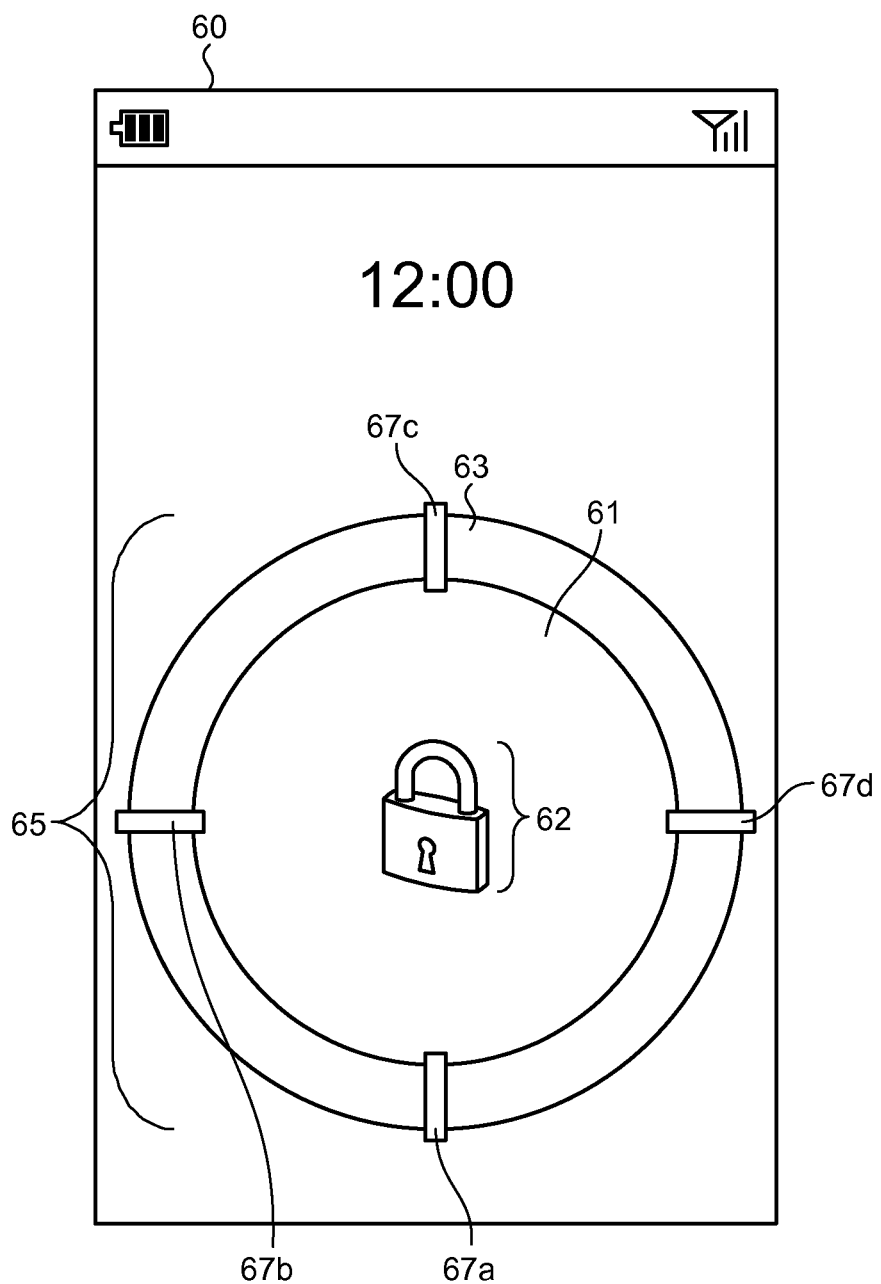
FIG. 18 is a diagram illustrating an example of the lock screen.

FIG. 18 depicts an example of a lock screen different from that of FIG. 12. FIG. 18 is a diagram illustrating an example of the lock screen. The lock screen 60 illustrated in FIG. 18 is a screen initially displayed on the display 2A when the display 2A has recovered from its blackout. Hereinafter, for the sake of convenience of explanation, the lock screen 60 in FIG. 18 may be referred to as "initial screen". Displayed on the lock screen 60 is the object 65 further including markers 67a to 67d in addition to the display area 61 and the path 63. The markers 67a to 67d are indications to change an icon to be displayed in the display area 61.

Figure 19:
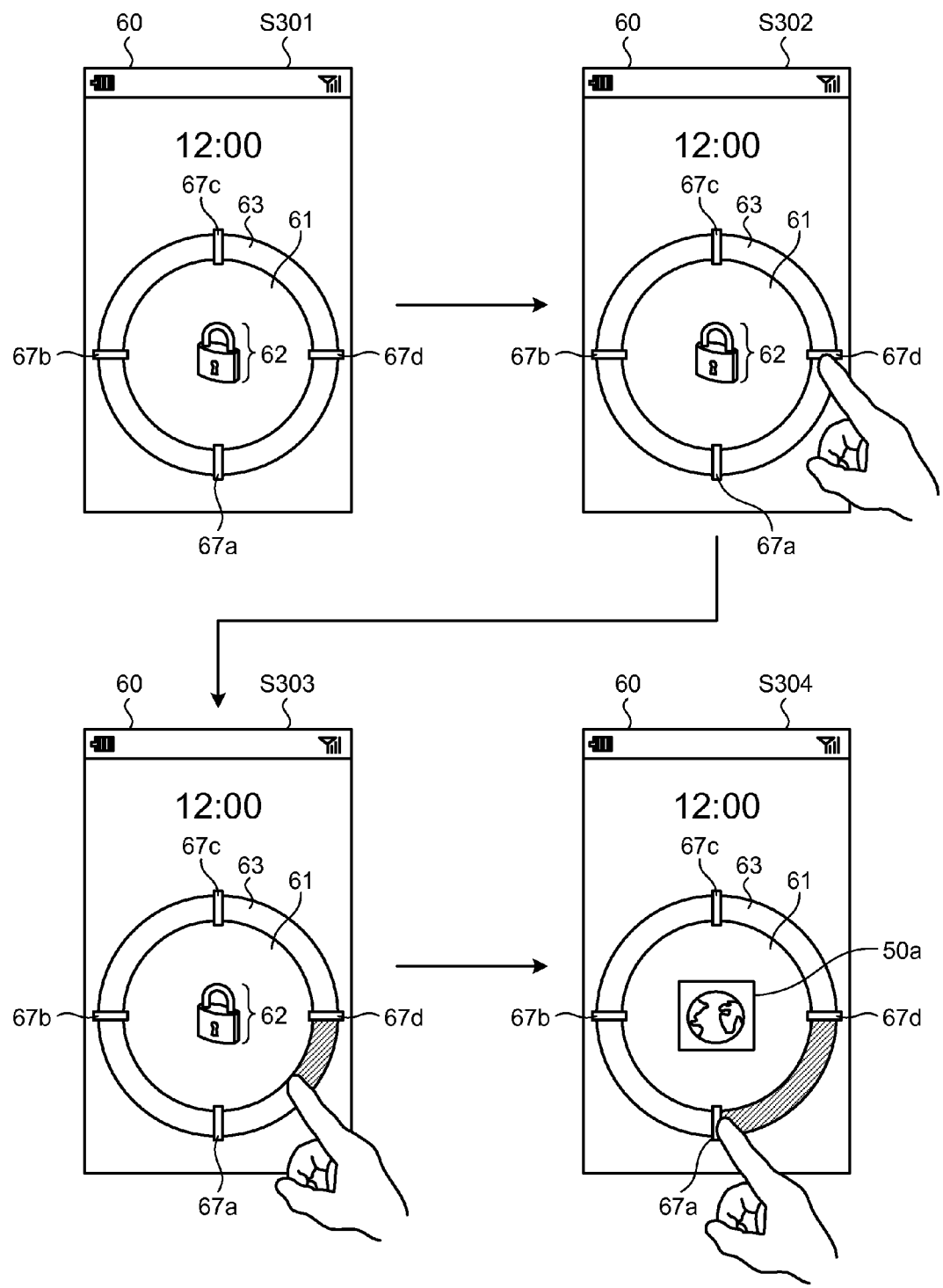
FIG. 19 is a diagram illustrating an example of control to change an icon according to a position of a finger during swipe.

FIG. 19 depicts an example of the control to change an icon according to a position of the finger during swipe. Step S301 represents the locked state in which the image 62 is displayed in the display area 61 of the lock screen 60. Step S302 represents a state in which the user's finger is in contact to the marker 67d of the lock screen 60. Step S303 represents a state in which the user's finger is swiped clockwise from the marker 67d. Step S304 represents a state in which the image 62 displayed in the display area 61 is changed to the icon 50a.

At Step S302 to Step S304, when detecting the swipe from the marker 67d to the marker 67a of the lock screen 60 from the detection result of the touch screen 2B, the smartphone 1 changes the image 62 displayed in the display area 61 to the icon 50a. The smartphone 1 changes the color of the path 63 along part of which the swipe is made from Step S302 to Step S304.

In the case of FIG. 19, when the swipe reaches any of the markers, the smartphone 1 changes an icon; however, the embodiment is not limited thereto. When detecting touches or taps performed on two markers, the smartphone 1 may change the icon. In the case of FIG. 19, for example, when accepting an operation of the button 3 by the user after the swipe is performed on the path 63, the smartphone 1 may return the display mode of the lock screen 60 to the initial screen illustrated in FIG. 18.

Figure 20:
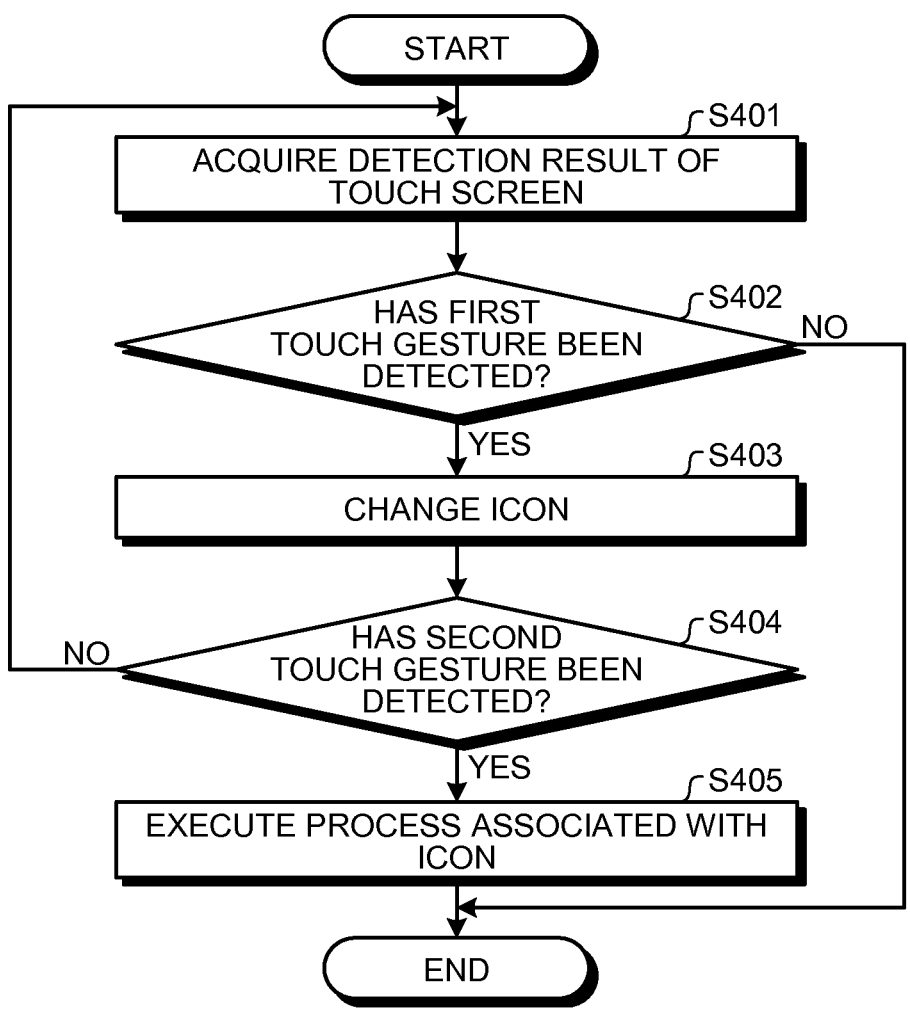
FIG. 20 is a diagram illustrating an example of a procedure of the control based on a function provided by a control program 9A.

An example of a procedure of control based on the function provided by the control program 9A will be explained below with reference to FIG. 20. FIG. 20 is a diagram illustrating an example of the procedure of the control based on the function provided by the control program 9A. The procedure in FIG. 20 is implemented by the controller 10 executing the control program 9A. The procedure in FIG. 20 is repeatedly executed by the controller 10 during continuation of the locked state.

As illustrated in FIG. 20, at Step S401, the controller 10 acquires a detection result of the touch screen 2B. Then, at Step S402, the controller 10 determines whether a first touch gesture has been detected.

When the first touch gesture has been detected as the result of detection (Yes at Step S402), then at Step S403, the controller 10 changes an icon to be displayed in the display area 61 according to the first touch gesture. Subsequently, at Step S404, the controller 10 determines whether a second touch gesture has been detected.

When the second touch gesture has been detected as the result of detection (Yes at Step S404), then at Step S405, the controller 10 executes the process associated with the icon displayed in the display area 61.

Meanwhile, when the second touch gesture has not been detected as the result of detection at Step S404 (No at Step S404), the controller 10 returns to Step S401 and continues the processes.

When the first touch gesture has not been detected as the result of detection at Step S402 (No at Step S402), the controller 10 ends the process.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
   a touch screen display configured to display a lock screen in a locked state, wherein one icon, which is any one of a plurality of icons including a lock icon and a plurality of application icons, is displayed in the lock screen at a time; and
   a controller configured to cause the touch screen display to display any one of the plurality of icons in the lock screen,
   wherein:
     the lock screen is divided into a display area and a non-display area, any one of the plurality of icons is displayed in the display area, and no icon among the plurality of icons is displayed in the non-display area, the controller is configured to:
- cause the touch screen display to initially display the lock icon in the display area in the locked state,
- change the lock icon displayed in the display area to a target application icon selected from the plurality of application icons according to a first touch gesture detected through the touch screen display, and
- release the locked state and execute a process corresponding to the target application icon displayed in the display area at a time when a second touch gesture is detected through the touch screen display, the second touch gesture is a gesture performed continuously after the first touch gesture, the touch screen display is configured to further display a path around the display area, and the controller is configured to:
- in response to a first swipe detected along the displayed path,
  - change the lock icon displayed in the display area, according to a first movement distance of the first swipe, to a first application icon among the plurality of application icons, and
  - change a display mode of a first portion of the displayed path corresponding to the first movement distance, and
- in response to a second swipe detected along the displayed path after the first swipe was interrupted, the second swipe beginning at a position different from a position where the first swipe was interrupted,
  - add a second movement distance of the second swipe to the first movement distance of the first swipe to obtain an added movement distance,
  - change the first application icon displayed in the display area, according to the added movement distance, to a second application icon among the plurality of application icons, the second application icon different from the first application icon, and
  - change a display mode of a second portion of the displayed path corresponding to the second movement distance.

2. The device according to claim 1, wherein the controller is configured to change the icon to be displayed in the display area according to a movement distance, a contact position, number of times, or a duration of the first touch gesture.

3. The device according to claim 1, wherein the second touch gesture is a release gesture.

4. The device according to claim 1, wherein the second touch gesture is a sweep gesture.

5. The device according to claim 1, wherein the controller is configured to change the icon displayed in the display area such that one icon is replaced by another.

6. The device according to claim 1, wherein the path has a form of a circle.

7. The device according to claim 1, wherein, when a third touch gesture is detected at a position where the first touch gesture is interrupted, the controller is configured to change the icon displayed in the display area according to the third touch gesture such that the changing of the icon is resumed from a state where the first touch gesture is interrupted.

8. The device according to claim 1, wherein, when the device is in the locked state, the execution of the process requires only the first and second touch gestures.

9. The device according to claim 1, wherein the first and second touch gestures belong to a single continuous swipe.

10. The device according to claim 1, wherein
the first touch gesture is detected in the non-display area, and
the second touch gesture is detected in the display area.

11. The device according to claim 1, wherein each application icon among the plurality of application icons, when displayed as the one icon in the lock screen, is an image that does not change regardless of whether a process corresponding to said application icon is executed or not.

12. The device according to claim 1, wherein
when the device is in the locked state, the execution of the process requires only the first and second touch gestures,
the first and second touch gestures belong to a single continuous swipe, the first touch gesture is detected in the non-display area, and
the second touch gesture is detected in the display area, and
each application icon among the plurality of application icons, when displayed as the one icon in the lock screen, is an image that does not change regardless of whether a process corresponding to said application icon is executed or not.

13. A method of controlling a device with a touch screen display, the method comprising:
displaying, on the touch screen display, a lock screen in a locked state, wherein one icon, which is any one of a plurality of icons including a lock icon and a plurality of application icons, is displayed in the lock screen at a time, wherein:
- the lock screen is divided into a display area and a non-display area, any one of the plurality of icons is displayed in the display area, and
- no icon among the plurality of icons is displayed in the non-display area; displaying any one of the plurality of icons in the display area in the locked state by:
  - initially displaying the lock icon in the display area in the locked state, and
  - changing the lock icon displayed in the display area to a target application icon selected from the plurality of application icons according to a first touch gesture detected through the touch screen display; and
releasing the locked state and executing a process corresponding to the target application icon displayed in the display area at a time when a second touch gesture is detected through the touch screen display,
wherein the second touch gesture is a gesture performed continuously after the first touch gesture, and
wherein the method further comprises:
further displaying a path around the display area;
in response to a first swipe detected along the display path,
- changing the lock icon displayed in the display area, according to a first movement distance of the first swipe, to a first application icon among the plurality of application icons, and
- changing a display mode of a first portion of the displayed path corresponding to the first movement distance, and
in response to a second swipe detected along the displayed path after the first swipe was interrupted, the second swipe beginning at a position different from a position where the first swipe was interrupted, adding a second movement distance of the second swipe to the first movement distance of the first swipe to obtain an added movement distance, changing the first application icon displayed in the display area, according to the added movement distance, to a second application icon among the plurality of application icons, the second application icon different from the first application icon, and changing a display mode of a second portion of the displayed path corresponding to the second movement distance.

14. A non-transitory storage medium that stores a program for causing, when executed by a device with a touch screen display, the device to execute:

displaying, on the touch screen display, a lock screen in a locked state, wherein one icon, which is any one of a plurality of icons including a lock icon and a plurality of application icons, is displayed in the lock screen at a time, wherein:

the lock screen is divided into a display area and a non-display area, any one of the plurality of icons is displayed in the display area, and no icon among the plurality of icons is displayed in the non-display area;

displaying any one of the plurality of icons in the display area in the locked state by:

initially displaying the lock icon in the display area in the locked state, and changing the lock icon displayed in the display area to a target application icon selected from the plurality of application icons according to a first touch gesture detected through the touch screen display; and releasing the locked state and executing a process corresponding to the target application icon displayed in the display area at a time when a second touch gesture is detected through the touch screen display, wherein the second touch gesture is a gesture performed continuously after the first touch gesture, and wherein the program further causes the device to execute:

further displaying a path around the display area;

in response to a first swipe detected along the displayed path, changing the lock icon displayed in the display area, according to a first movement distance of the first swipe, to a first application icon among the plurality of application icons, and changing a display mode of a first portion of the displayed path corresponding to the first movement distance, and in response to a second swipe detected along the displayed path after the first swipe was interrupted, the second swipe beginning at a position different from a position where the first swipe was interrupted, adding a second movement distance of the second swipe to the first movement distance of the first swipe to obtain an added movement distance, changing the first application icon displayed in the display area, according to the added movement distance, to a second application icon among the plurality of application icons, the second application icon different from the first application icon, and changing a display mode of a second portion of the displayed path corresponding to the second movement distance.

* * * * *